United States Patent
Zhang et al.

(10) Patent No.: US 12,210,585 B2
(45) Date of Patent: Jan. 28, 2025

(54) EFFICIENT TEST-TIME ADAPTATION FOR IMPROVED TEMPORAL CONSISTENCY IN VIDEO PROCESSING

(71) Applicant: QUALCOMM Incorporated, San Diego, CA (US)

(72) Inventors: Yizhe Zhang, San Diego, CA (US); Shubhankar Mangesh Borse, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 979 days.

(21) Appl. No.: 17/198,147

(22) Filed: Mar. 10, 2021

(65) Prior Publication Data
US 2022/0292302 A1    Sep. 15, 2022

(51) Int. Cl.
  G06N 3/04        (2023.01)
  G06F 18/214      (2023.01)
  G06N 3/045       (2023.01)
  G06N 3/08        (2023.01)
  G06N 3/084       (2023.01)

(52) U.S. Cl.
  CPC .......... *G06F 18/214* (2023.01); *G06N 3/045* (2023.01); *G06N 3/084* (2013.01)

(58) Field of Classification Search
  CPC ................ G06N 3/045; G06N 3/084
  See application file for complete search history.

(56) References Cited

U.S. PATENT DOCUMENTS

| | | | | |
|---|---|---|---|---|
| 2021/0279595 A1* | 9/2021 | Sridhar | ................... | G06N 3/084 |
| 2022/0156591 A1* | 5/2022 | Li | ........................ | G06V 10/82 |
| 2022/0180193 A1* | 6/2022 | Caine | ........................ | G06N 3/08 |
| 2022/0188636 A1* | 6/2022 | Pham | ........................ | G06N 3/08 |
| 2022/0343163 A1* | 10/2022 | Takamoto | .............. | G06N 3/084 |
| 2023/0222326 A1* | 7/2023 | Jafari | ........................ | G06N 3/09 |
| | | | | 706/25 |
| 2023/0300354 A1* | 9/2023 | Li | ........................ | H04N 19/124 |
| | | | | 375/240.03 |
| 2023/0419082 A1* | 12/2023 | Yuan | .................... | G06N 3/0464 |
| 2024/0028903 A1* | 1/2024 | Ancora | .................. | G01S 17/86 |

FOREIGN PATENT DOCUMENTS

| | | | | | |
|---|---|---|---|---|---|
| CN | 110263842 A | * | 9/2019 | .......... | G06K 9/6273 |
| EP | 3608844 A1 | | 2/2020 | | |
| WO | 2018128741 A1 | | 7/2018 | | |

OTHER PUBLICATIONS

Shen, Jonathan, et al. "In teacher we trust: Learning compressed models for pedestrian detection." arXiv preprint arXiv:1612.00478 (2016). (Year: 2016).*
International Search Report and Written Opinion—PCT/US2022/019620—ISA/EPO—Jun. 29, 2022.

* cited by examiner

*Primary Examiner* — Hal Schnee
(74) *Attorney, Agent, or Firm* — QUALCOMM Incorporated

(57) ABSTRACT

A method for processing a video includes receiving a video as an input at a first layer of an artificial neural network (ANN). A first frame of the video is processed to generate a first label. Thereafter, the artificial neural network is updated based on the first label. The updating is performed while concurrently processing a second frame of the video. In doing so, the temporal inconsistency between labels is reduced.

13 Claims, 11 Drawing Sheets

EFFICIENT TEST-TIME ADAPTATION FOR IMPROVED TEMPORAL CONSISTENCY IN VIDEO PROCESSING

BACKGROUND

Field

Aspects of the present disclosure generally relate to neural networks, and more particularly, to video processing.

Background

Artificial neural networks may comprise interconnected groups of artificial neurons (e.g., neuron models). The artificial neural network may be a computational device or represented as a method to be performed by a computational device.

Neural networks consist of operands that consume tensors and produce tensors. Neural networks can be used to solve complex problems, however, because the network size and the number of computations that may be performed to produce the solution may be voluminous, the time for the network to complete a task may be long. Furthermore, because these tasks may be performed on mobile devices, which may have limited computational power, the computational costs of deep neural networks may be problematic.

Convolutional neural networks are a type of feed-forward artificial neural network. Convolutional neural networks may include collections of neurons that each have a receptive field and that collectively tile an input space. Convolutional neural networks (CNNs) such as deep convolutional neural networks (DCNs) have numerous applications. In particular, these neural network architectures are used in various technologies, such as image recognition, pattern recognition, speech recognition, autonomous driving, object segmentation in a video stream, video processing and other classification tasks.

Modern deep learning-based video processing methods or models may generate inconsistent outputs over time. In some cases, the inconsistency may be observed in the form of a flicker in the display or other misalignments. Temporally inconsistent outputs (e.g., flickering) may degrade the user's experience and enjoyment, as well as system stability and performance.

SUMMARY

In an aspect of the present disclosure, a method for processing a video is provided. The method includes receiving the video as an input at a first layer of an artificial neural network (ANN). The method also includes processing a first frame of the video to generate a first label. Additionally, the method includes updating the artificial neural network based on the first label. The update of the artificial neural network is performed while concurrently processing a second frame of the video.

In another aspect of the present disclosure, an apparatus for processing a video is provided. The apparatus includes a memory and one or more processors coupled to the memory. The processor(s) are configured to receive the video as an input at a first layer of an artificial neural network (ANN). The processor(s) are also configured to process a first frame of the video to generate a first label. Further, the processor(s) are configured to update the artificial neural network based on the first label. The update of the artificial neural network is performed while concurrently processing a second frame of the video.

In an aspect of the present disclosure, an apparatus for processing a video is provided. The apparatus includes means for receiving the video as an input at a first layer of an artificial neural network. The apparatus also includes means for processing a first frame of the video to generate a first label. In addition, the apparatus includes means for updating the artificial neural network based on the first label. The update of the artificial neural network is performed while concurrently processing a second frame of the video.

In a further aspect of the present disclosure, a non-transitory computer readable medium is provided. The computer readable medium has encoded thereon program code for processing a video. The program code is executed by a processor and includes code to receive the video as an input at a first layer of an artificial neural network. The program code also includes code to process a first frame of the video to generate a first label. Furthermore, the program code includes code to update the artificial neural network based on the first label. The update of the artificial neural network is performed while concurrently processing a second frame of the video.

In an aspect of the present disclosure, a method for processing a video is provided. The method includes receiving the video as an input at a first layer of a first artificial neural network and a second artificial neural network. The first artificial neural network has fewer channels than the second artificial neural network. The method also includes processing a first frame of the video via the first artificial neural network to generate a first label. The first artificial neural network supplies intermediate features extracted from the first frame of the video to the second artificial neural network. Additionally, the method includes processing the first frame of the video via the second artificial neural network to generate a second label based on the intermediate features and the first frame. Further, the method includes updating the first artificial neural network based on the first label while the second artificial neural network concurrently processes a second frame of the video.

In an aspect of the present disclosure, an apparatus for processing a video is provided. The apparatus includes a memory and one or more processors coupled to the memory. The processor(s) are configured to receive the video as an input at a first layer of a first artificial neural network and a second artificial neural network. The first artificial neural network has fewer channels than the second artificial neural network. The processor(s) are also configured to process a first frame of the video via the first artificial neural network to generate a first label. The first artificial neural network supplies intermediate features extracted from the first frame of the video to the second artificial neural network. In addition, the processor(s) are configured to process the first frame of the video via the second artificial neural network to generate a second label based on the intermediate features and the first frame. Further, the processor(s) are configured to update the first artificial neural network based on the first label while the second artificial neural network concurrently processes a second frame of the video.

In an aspect of the present disclosure, an apparatus for processing a video is provided. The apparatus includes means for receiving the video as an input at a first layer of a first artificial neural network and a second artificial neural network. The first artificial neural network has fewer channels than the second artificial neural network. The apparatus also includes means for processing a first frame of the video via the first artificial neural network to generate a first label. The first artificial neural network supplies intermediate features extracted from the first frame of the video to the second artificial neural network. Additionally, the apparatus includes means for processing the first frame of the video via the second artificial neural network to generate a second label based on the intermediate features and the first frame. Further, the apparatus includes means for updating the first artificial neural network based on the first label while the second artificial neural network concurrently processes a second frame of the video.

In an aspect of the present disclosure, a non-transitory computer readable medium is provided. The computer readable medium has encoded thereon program code for processing a video. The program code is executed by a processor and includes code to receive the video as an input at a first layer of a first artificial neural network and a second artificial neural network. The first artificial neural network has fewer channels than the second artificial neural network. The program code also includes code to processing a first frame of the video via the first artificial neural network to generate a first label. The first artificial neural network supplies intermediate features extracted from the first frame of the video to the second artificial neural network. Additionally, the program code includes code to process the first frame of the video via the second artificial neural network to generate a second label based on the intermediate features and the first frame. Furthermore, the program code includes code to update the first artificial neural network based on the first label while the second artificial neural network concurrently processes a second frame of the video.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
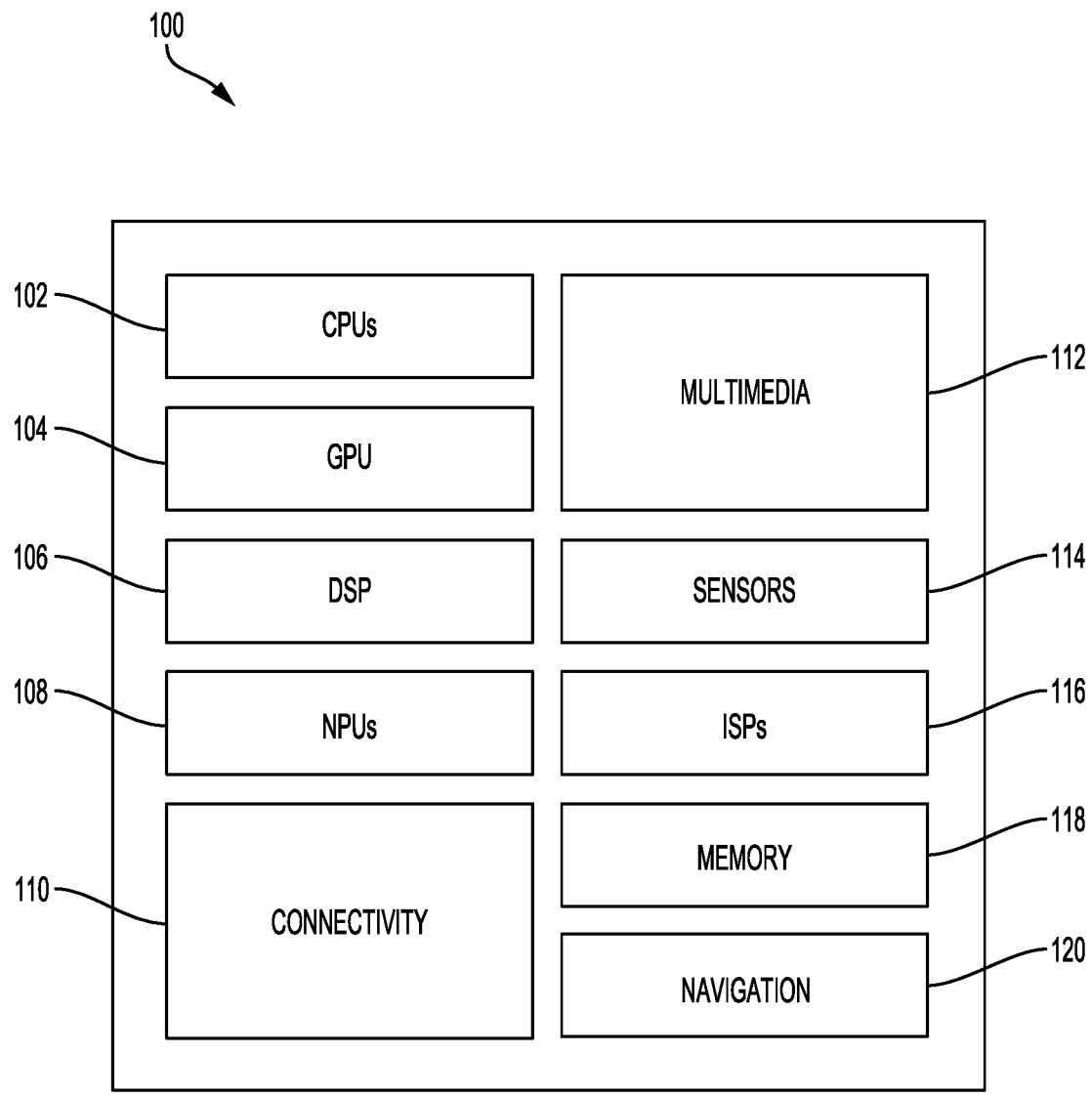
FIG. 1 illustrates an example implementation of a neural network using a system-on-a-chip (SoC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Neural networks can be used to solve complex problems, however, because the network size and the number of computations that may be performed to produce the solution may be voluminous, the time for the network to complete a task may be long. Furthermore, because these tasks may be performed on mobile devices, which may have limited computational power, the computational costs of deep neural networks may be problematic.

Conventional deep learning-based video proccessing methods or models may generate inconsistent outputs over time. In some cases, the inconsistency may be observed in the form of a flicker in the display or other misalignments. Temporally inconsistent outputs (e.g., flickering) may degrade the users experience and enjoyment, as well as system stability.

One reason for temporal inconsistent outputs (e.g., predictions) is that a neural network may provide uncertain predictions, for example, when the output is about 0.5. In such a case, the neural network may produce predictions in an arbitrary fashion. Accordingly, segmentation accuracy may drop significantly for some frames in a video stream (which are between more-accurately segmented frames). As such, similar looking image areas processed by the neural network may result in different predictions. Moreover, the decrease in segmentation accuracy may negatively impact performance.

To address this issue, aspects of the present disclosure are directed to online (e.g., at test-time) adaptation of a segmentation model. A segmentation network for processing a video may be updated while processing the video. In some aspects, an auxilliary network may be incorporated with the segmentation network to conduct network updates while the segmentation network continues to process the video.

FIG. 1 illustrates an example implementation of a system-on-a-chip (SoC) 100, which may include a central processing unit (CPU) 102 or a multi-core CPU configured for video processing using an artificial neural network (e.g., a neural end-to-end network). Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SoC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SoC 100 may also include a sensor processor 114, image signal processors (ISPs) 116, and/or navigation module 120, which may include a global positioning system.

The SoC 100 may be based on an ARM instruction set. In an aspect of the present disclosure, the instructions loaded into the general-purpose processor 102 may include code to receive a video as an input at a first layer of an artificial neural network (ANN). The general-purpose processor 102 may also include code to process a first frame of the video to generate a first label. The general-purpose processor 102 may further include code to update the artificial neural network based on the first label. The update is performed while concurrently processing a second frame of the video.

In an aspect of the present disclosure, the instructions loaded into the general-purpose processor 102 may include code to receive a video as an input at a first layer of a first artificial neural network (ANN) and a second artificial neural network. The first artificial neural network has fewer channels than the second artificial neural network. The general-purpose processor 102 may also include code to process a first frame of the video via the first artificial neural to generate a first label. The first artificial neural network supplies intermediate features extracted from the first frame of the video to the second artificial neural network. The general-purpose processor 102 may further include code to process the first frame of the video via the second artificial neural network to generate a second label based on the intermediate features and the first frame. The general-purpose processor 102 may additionally include code to update the first artificial neural network based on the first label while the second artificial neural network concurrently processes a second frame of the video.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
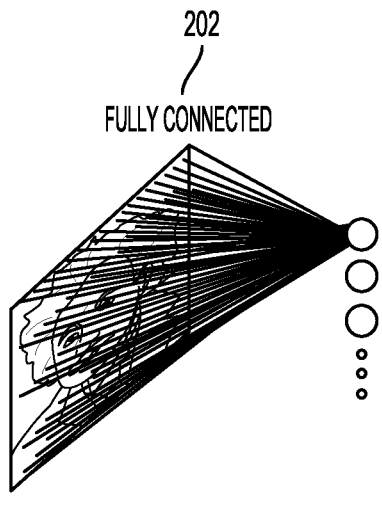
FIGS. 2A, 2B, and 2C are diagrams illustrating a neural network, in accordance with aspects of the present disclosure.
Figure 2B:
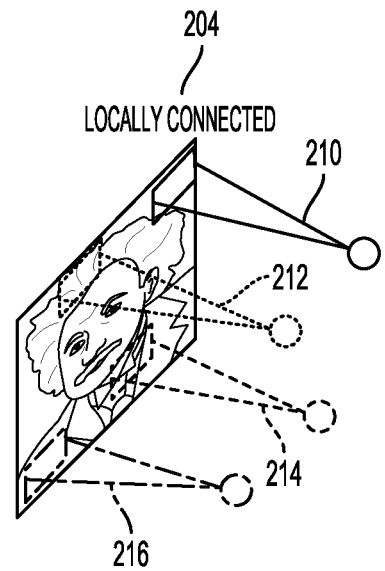

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
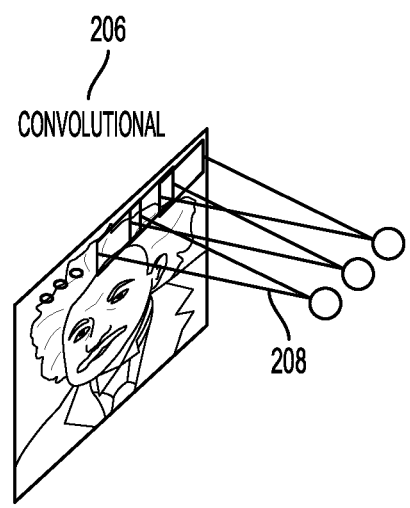

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
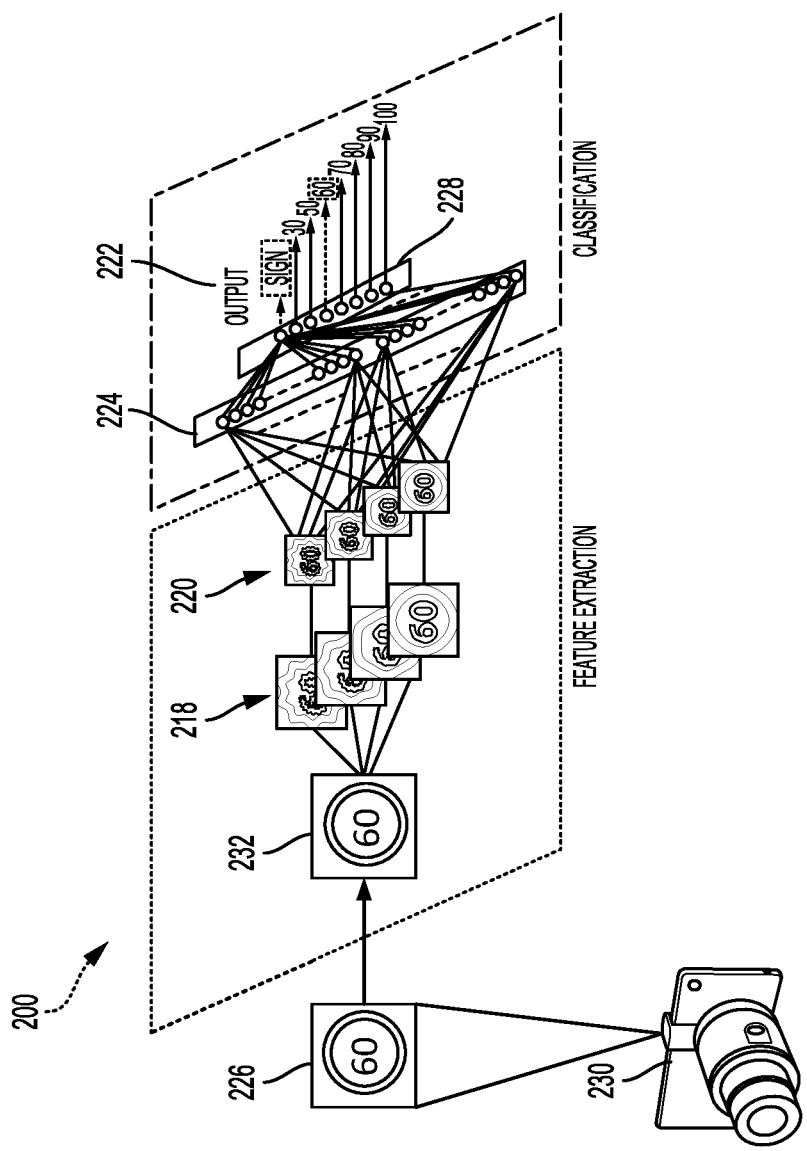
FIG. 2D is a diagram illustrating an exemplary deep convolutional network (DCN), in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down-sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
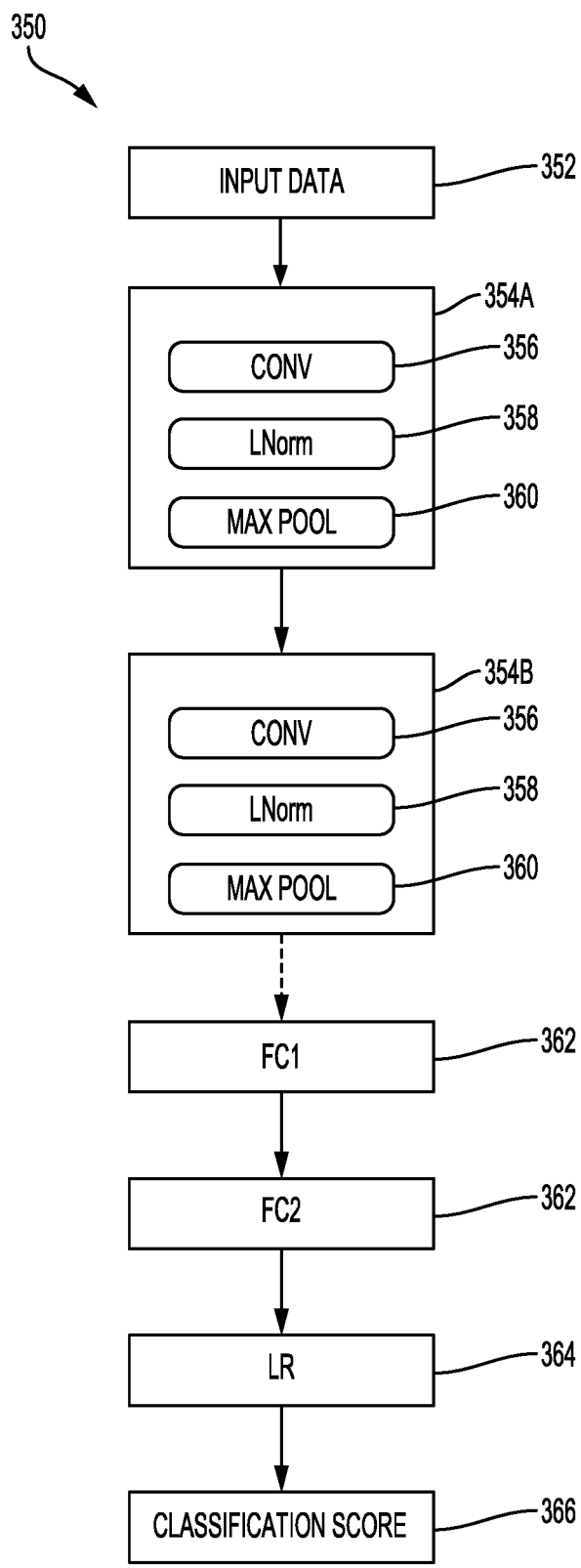
FIG. 3 is a block diagram illustrating an exemplary deep convolutional network (DCN), in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down-sampling aggregation over space for local invariance and dimensionality reduction.

The parallel filter banks, for example, of a deep convolutional network may be loaded on a CPU 102 or GPU 104 of an SoC 100 to achieve high performance and low power consumption. In alternative embodiments, the parallel filter banks may be loaded on the DSP 106 or an ISP 116 of an SoC 100. In addition, the deep convolutional network 350 may access other processing blocks that may be present on the SoC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
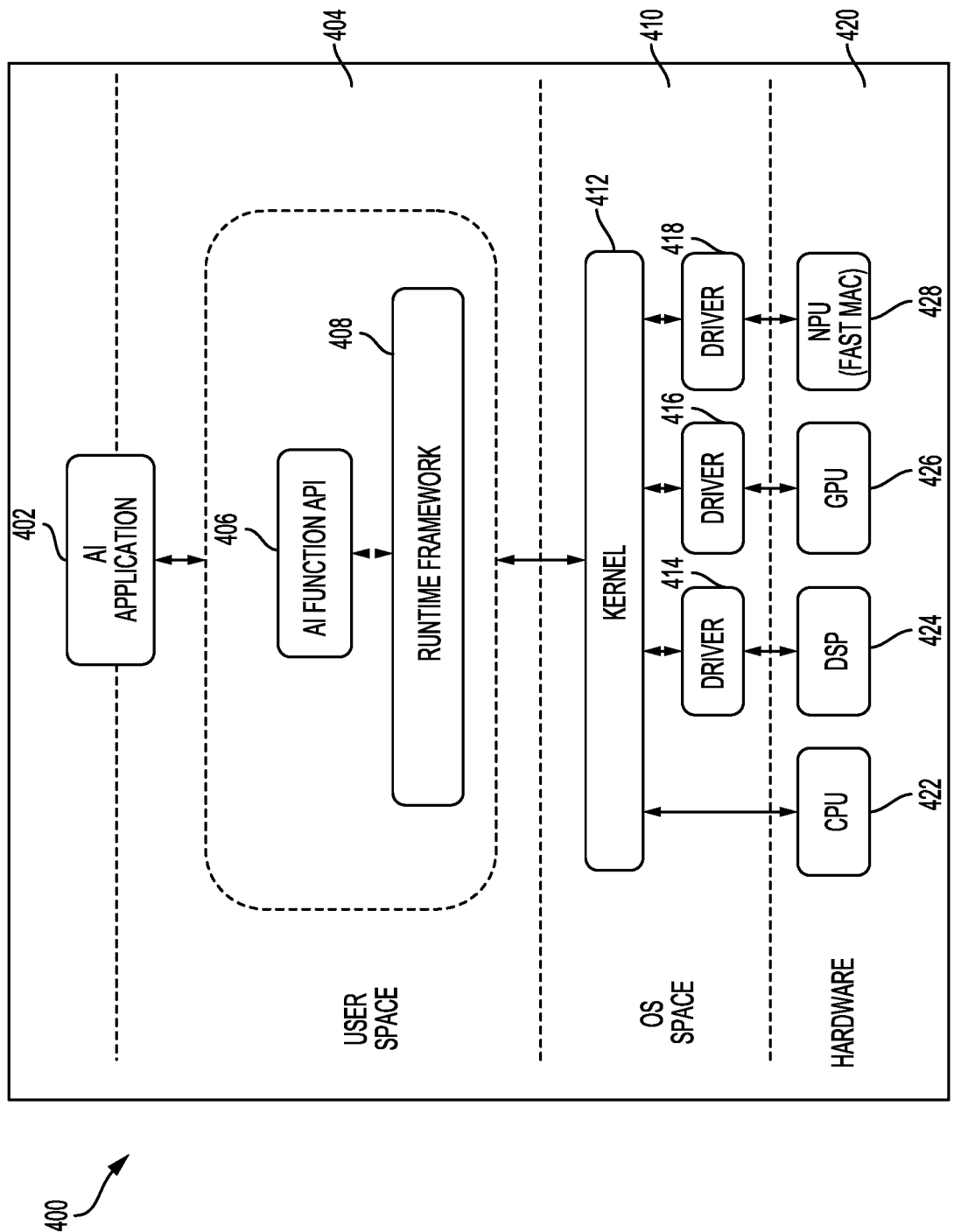
FIG. 4 is a block diagram illustrating an exemplary software architecture that may modularize artificial intelligence (AI) functions.

FIG. 4 is a block diagram illustrating an exemplary software architecture 400 that may modularize artificial intelligence (AI) functions. Using the architecture, applications may be designed that may cause various processing blocks of a system-on-a-chip (SoC) 420 (for example a CPU 422, a DSP 424, a GPU 426 and/or an NPU 428) to support adaptive rounding as disclosed for post-training quantization for an AI application 402, according to aspects of the present disclosure.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine, for example, to request an inference at a particular time interval or triggered by an event detected by the user interface of the application. When caused to provide an inference response, the run-time engine may in turn send a signal to an operating system in an operating system (OS) space, such as a Kernel 412, running on the SoC 420. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

The application 402 (e.g., an AI application) may be configured to call functions defined in a user space 404 that may, for example, provide for the detection and recognition of a scene indicative of the location in which the device currently operates. The application 402 may, for example, configure a microphone and a camera differently depending on whether the recognized scene is an office, a lecture hall, a restaurant, or an outdoor setting such as a lake. The application 402 may make a request to compiled program code associated with a library defined in a SceneDetect application programming interface (API) 406 to provide an estimate of the current scene. This request may ultimately rely on the output of a differential neural network configured to provide scene estimates based on video and positioning data, for example.

A run-time engine 408, which may be compiled code of a Runtime Framework, may be further accessible to the application 402. The application 402 may cause the run-time engine, for example, to request a scene estimate at a particular time interval or triggered by an event detected by the user interface of the application. When caused to estimate the scene, the run-time engine may in turn send a signal to an operating system 410, such as a Kernel 412, running on the SoC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the differential neural network may be configured to run on a combination of processing blocks, such as a CPU 422 and a GPU 426, or may be run on an NPU 428.

Aspects of the present disclosure are directed to deep neural network model transplantation using adversarial function approximation.

Figure 5:
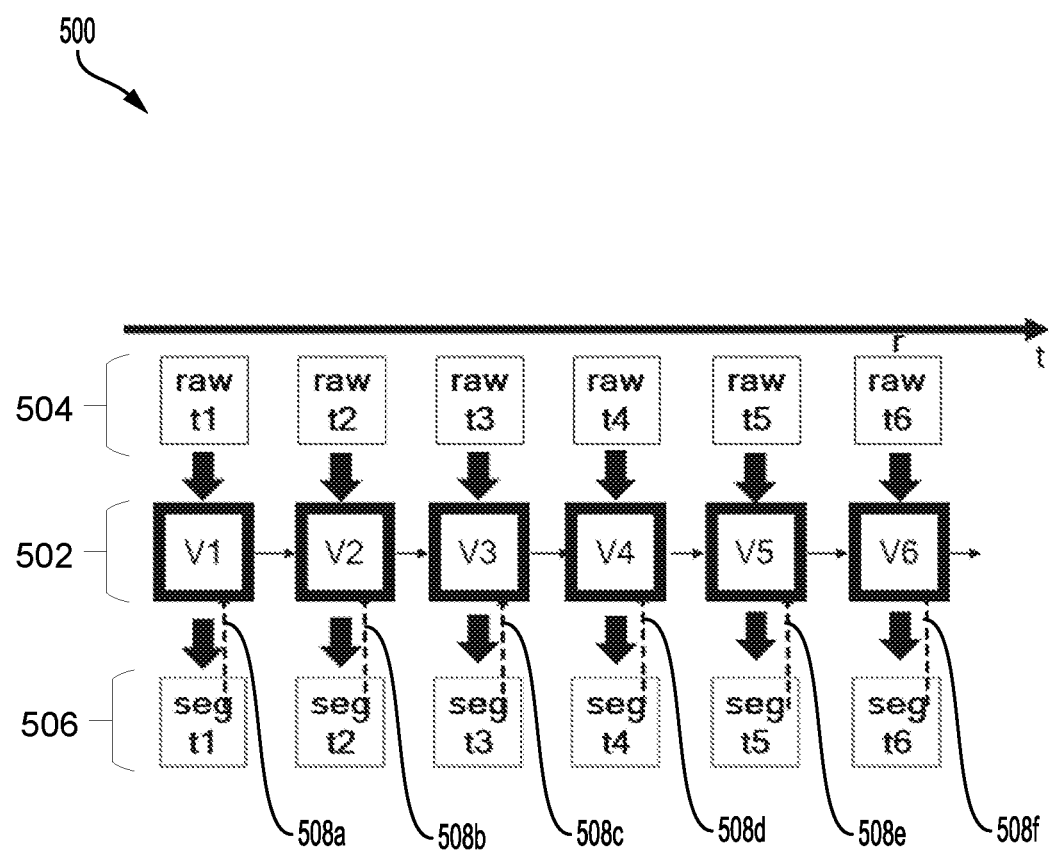
FIG. 5 is a block diagram illustrating an example architecture for processing a video, in accordance with aspects of the present disclosure.

FIG. 5 is a block diagram illustrating an example architecture 500 for processing a video, in accordance with aspects of the present disclosure. As shown in FIG. 5, a segmentation network 502 receives a video 504 as input. The segmentation network 502 may, for example, be a convolutional neural network such as the deep convolutional network 350 shown in FIG. 3. The video 504 is divided in frames (e.g., raw t1, raw t2, raw t3, raw t4, raw t5, and raw t6). The segmentation network 502 processes each frame of the video 504 sequentially and generates an output 506 in the form of a segment (e.g., seg t1, seg t2, seg t3, seg t4, seg t5, and seg t6). While processing the video 504, the segmentation network 502 may also be updated. As shown in FIG. 5, after generating each output segment, the segmentation network 502 is updated via a back pass (e.g., 508a-508f).

Figure 6:
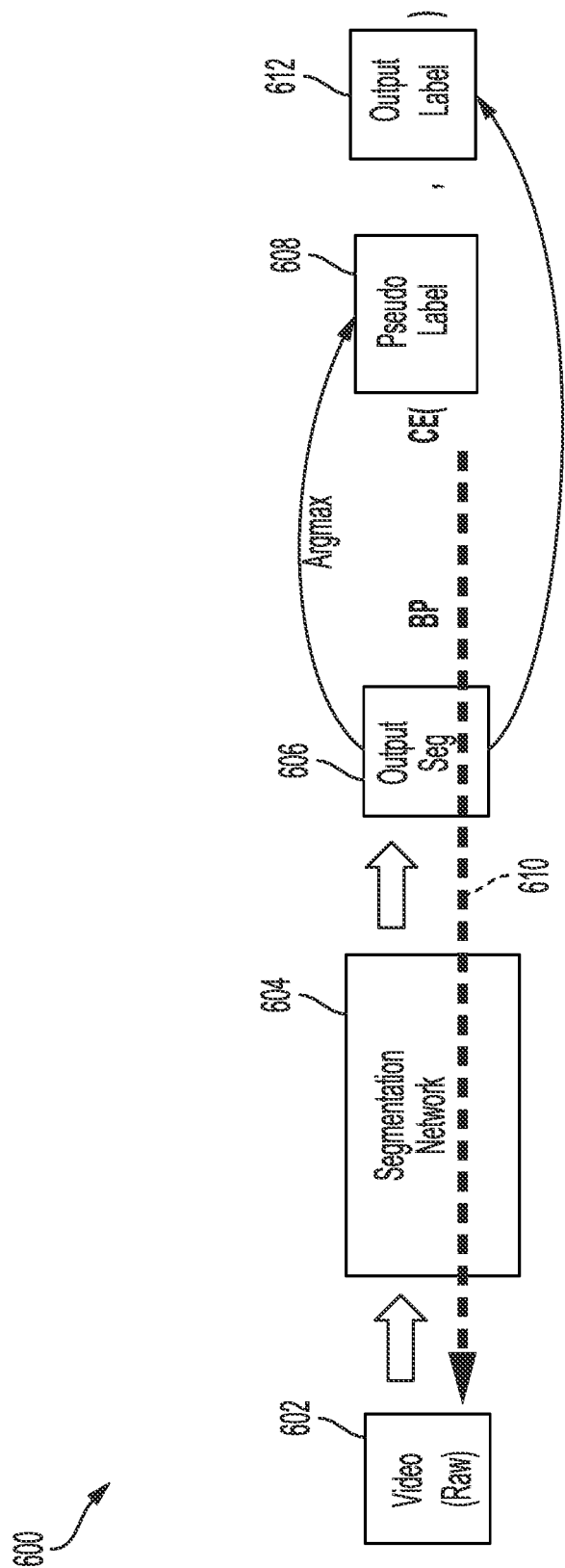
FIG. 6 is a block diagram illustrating an example architecture for processing a video, in accordance with aspects of the present disclosure.

FIG. 6 is a block diagram illustrating an example architecture 600 for processing a video, in accordance with aspects of the present disclosure. As shown in FIG. 6, a segmentation network 604 receives a video 602 as input. The segmentation network 604 may be configured to operate similar to the segmentation network 502 of FIG. 5. The segmentation network 604 processes each frame of the video 602 and generates an output segment 606. Each output segment 606 is subjected to an argmax operation to generate a pseudo-label 608 and an output label 612. Applying cross-entropy (CE) as a loss function, the negative log likelihood may be computed based on the pseudo label 608 and the output label 612. In turn, the segmentation network 604 may be updated via backpropagation (BP) to reduce the CE loss. In some aspects, the argmax may be used for determining the output label 612 and may be complemented by confidence values computed, for example, using softmax likelihoods or a logit function. Moreover, in some aspects, the confidence value may be a best estimation or second best estimation label ratio.

Figure 7:
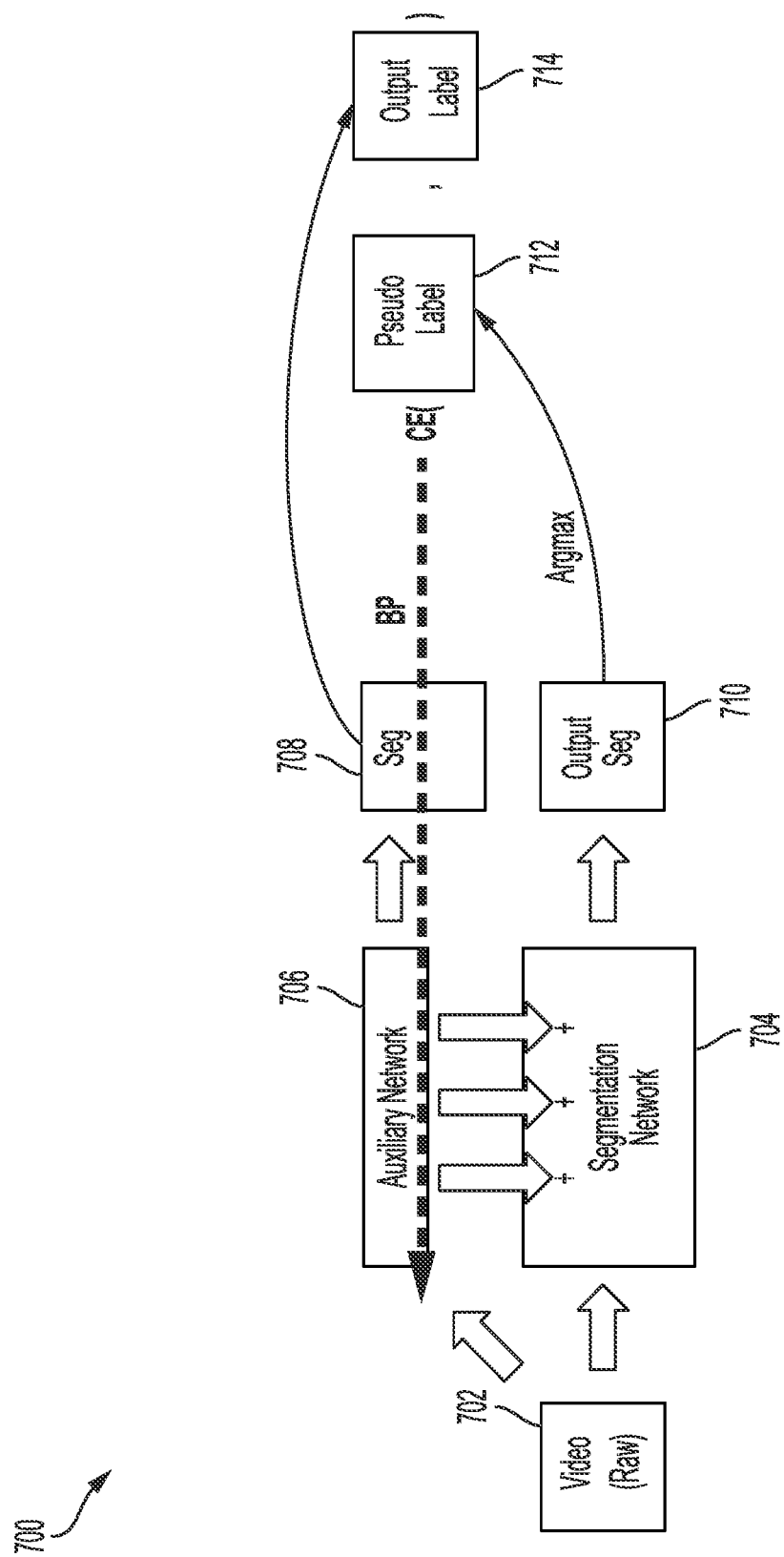
FIG. 7 is a block diagram illustrating an example architecture for processing a video, in accordance with aspects of the present disclosure.

FIG. 7 is a block diagram illustrating an example architecture 700 for processing a video, in accordance with aspects of the present disclosure. Referring to FIG. 7, the example architecture 700 includes a segmentation network 704 and an auxiliary network 706. The auxiliary network 706 may have a similar overall architecture to the architecture of the segmentation network 704. However, the auxiliary network 706 is smaller (e.g., $\frac{1}{10}$ the size) than the segmentation network 704. For instance, in some aspects, the auxiliary network 706 may be configured with fewer channels (e.g., the auxiliary network 706 may have 18 channels whereas the segmentation network 704 may have 48 channels) or may operate at a lower resolution than the segmentation network 704. In one example, the auxiliary network 706 may operate on a thirty-two bit CPU (e.g., the CPU 102 of FIG. 1) or GPU (e.g., the GPU 104 of FIG. 1) and the segmentation network 704 may operate on an eight-bit DSP (e.g., the DSP 106 of FIG. 1).

In operation, the segmentation network 704 and the auxiliary network 706 each receive a video 702 as input. The segmentation network 704 processes each frame of the video 702 and generates an output segment 710. The auxiliary network 706 processes each frame of the video 702 and generates a segment 708.

Additionally, the auxiliary network 706 supplies intermediate features to the segmentation network 704. The segmentation network 704 processes the intermediate features, which are aggregated (as indicated by the "+" signs) with intermediate features generated in the layers of the segmentation network to compute the output segment 710. Each output segment 710 is subjected to an argmax operation to generate a pseudo-label 712. Similarly, each segment 708 is subjected to an argmax operation to generate an output label 714.

The pseudo-label 712 and the output label 714 may be used to compute the cross entropy loss and update the auxiliary network 706, for example, via back propagation, while the segmentation network 704 continues to process the video 702 in the forward pass. Because the update is conducted on the smaller auxiliary network 706 rather than the segmentation network 704, the computational cost may be significantly reduced relative to the computational cost of the segmentation network 604 of FIG. 6.

Figure 8:
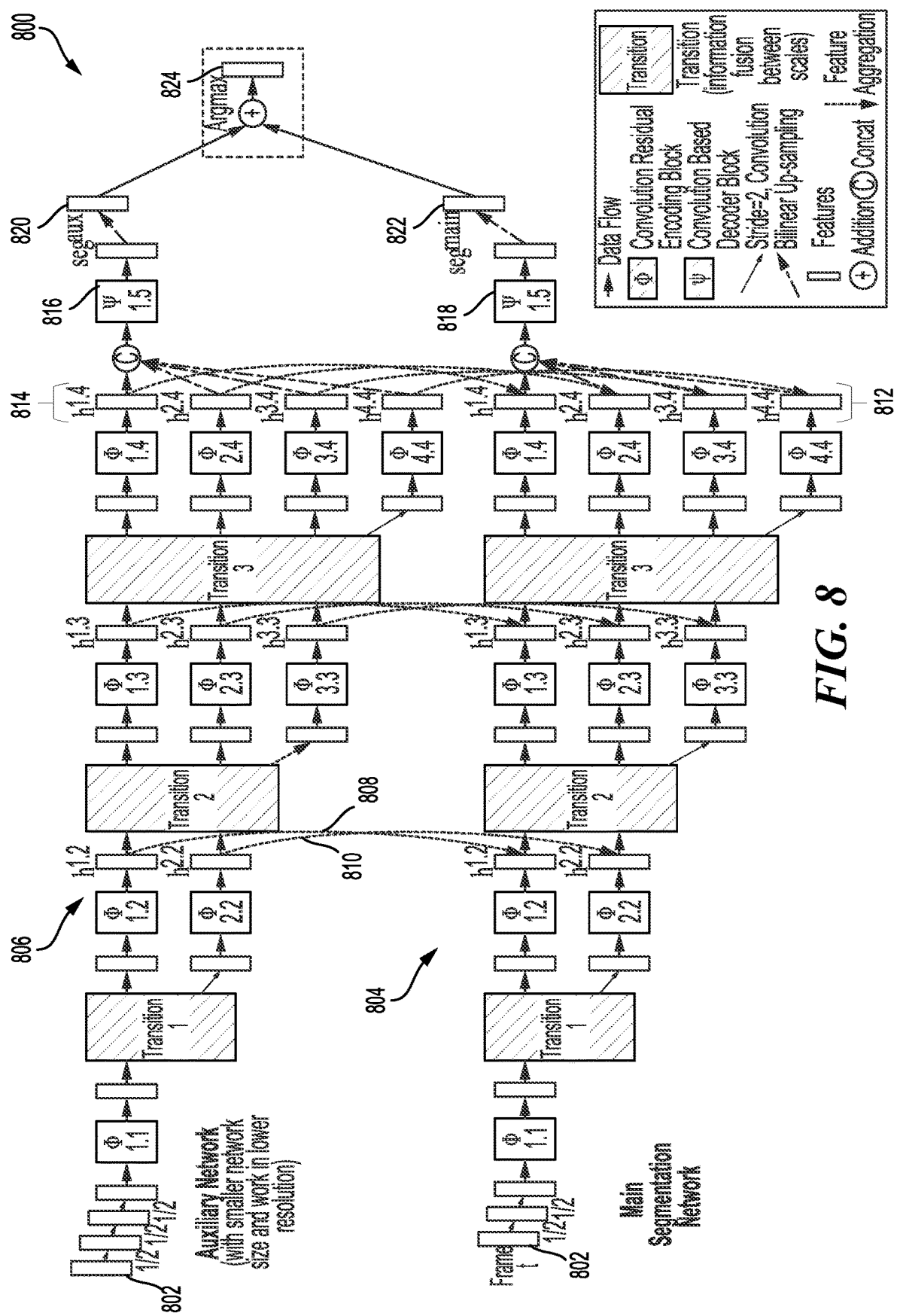
FIG. 8 is a more detailed diagram illustrating the example architecture for processing a video, in accordance with aspects of the present disclosure.

FIG. 8 is a more detailed diagram 800 illustrating the example architecture 700 of FIG. 7, in accordance with aspects of the present disclosure. Referring to FIG. 8, a segmentation network 804 and an auxiliary network 806 are shown. In the example of FIG. 8, the segmentation network 804 and the auxiliary network 806 may have similar architectures. For example, the segmentation network 804 and the auxiliary network 806 may be configured as an auto-encoder. As discussed above in relation to FIG. 7, the auxiliary network 806 may be smaller (e.g., ⅒ the size) than the segmentation network 804. For instance, in some aspects, the auxiliary network 806 may be configured with fewer channels (e.g., the auxiliary network 806 may have 18 channels whereas the segmentation network 804 may have 48 channels). Additionally, in some aspects, the auxiliary network 806 may operate at a lower resolution than the segmentation network 804. For instance, as shown in FIG. 8, the auxiliary network 806 and the segmentation network 804 both receive a video 802 as input. However, while the segmentation network 804 down-samples each frame of the video 802 three times, the auxiliary network 806 down-samples each frame of the video 802 four times to produce a lower resolution of each frame of the video as compared to the segmentation network 804.

Having down-sampled the frames of the video 802, the segmentation network 804 and the auxiliary network 806 each pass their respective lower resolution frames through successive layers of convolutional filters (e.g., convolutional encoding blocks) to extract features. Further down-sampling may be performed by via the transition blocks (e.g., transition 1, transition 2 and transition 3) of segmentation network 804 and the auxiliary network 806, respectively, to extract lower resolution features.

Additionally, the auxiliary network 806 may supply intermediate features (e.g., 808, 810) to the segmentation network 804. The intermediate features (e.g., 808, 810) may be mapped (to account for the larger number of channels in the segmentation network 804) and combined or aggregated with intermediate features of the segmentation network 804. The segmentation network 804 and the auxiliary network 806 each produce a set of output features (e.g., 812, 814), which may be up-sampled, concatenated, and supplied to a decoder (816, 818).

The decoders 816 and 818, in turn, process the output features (e.g., 812, 814) to generate output segments 820 and 822. Each of the output segments 820,822 is subjected to an argmax operation to generate a label 824.

Furthermore, the auxiliary network 806 may be updated using back propagation. Notably, the auxiliary network 806 is updated online (e.g., at test-time) as the segmentation network 804 continues to process the video 802. In doing so, the temporal inconsistency may be reduced (e.g., intersection over union metric may be increased). As such, a flickering effect observed in the video 802 may be reduced. Additionally, computational cost and processing time may be reduced.

Figure 9:
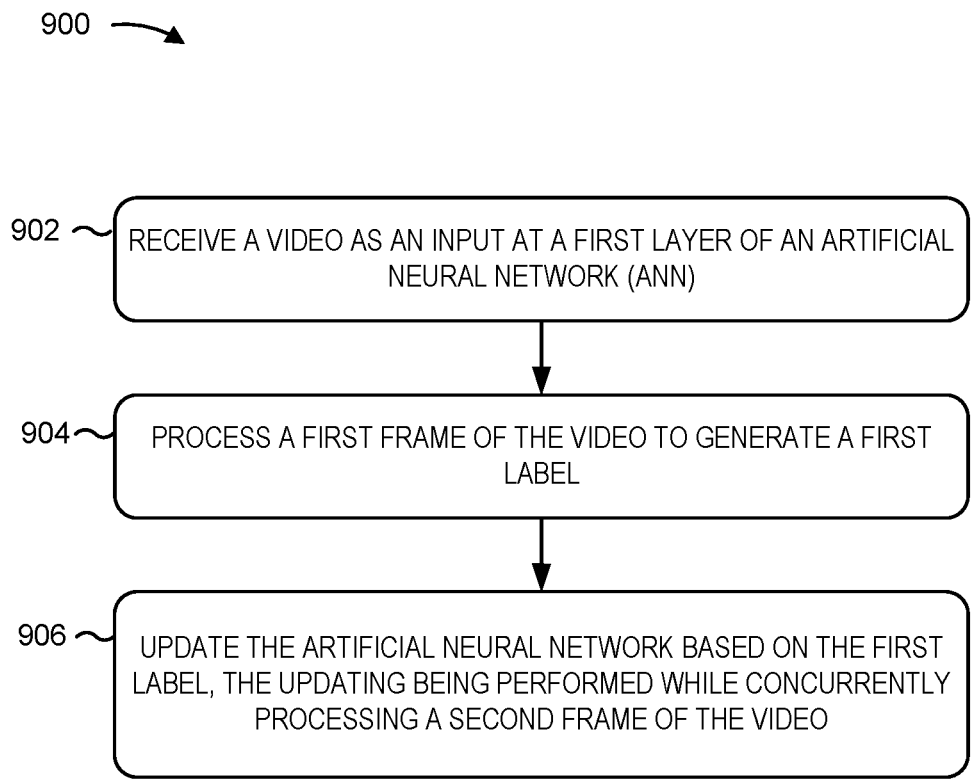
FIGS. 9 and 10 are flow diagrams illustrating methods for processing a video, in accordance with aspects of the present disclosure.

FIG. 9 illustrates a method 900 for processing a video, in accordance with aspects of the present disclosure. As shown in FIG. 9, at block 902, the method 900 receives a video input at a first layer of an artificial neural network (ANN). The first artificial neural network may be convolutional neural network such as deep convolutional network 350 of FIG. 3. As discussed in reference to FIG. 5, a segmentation network 502 receives a video 504 as an input.

At block 904, the method 900 processes a first frame of the video to generate a first label. As discussed in reference to FIG. 5, the segmentation network 502 processes each frame of the video 504 sequentially and generates an output 506 in the form of a segment (e.g., seg t1).

At block 906, the method 900 updates the artificial neural network based on the first label, the updating being performed while concurrently processing a second frame of the video. For example, as shown in FIG. 5, after generating each output segment, the segmentation network is updated via a back pass (e.g., 508a-508f).

Figure 10:
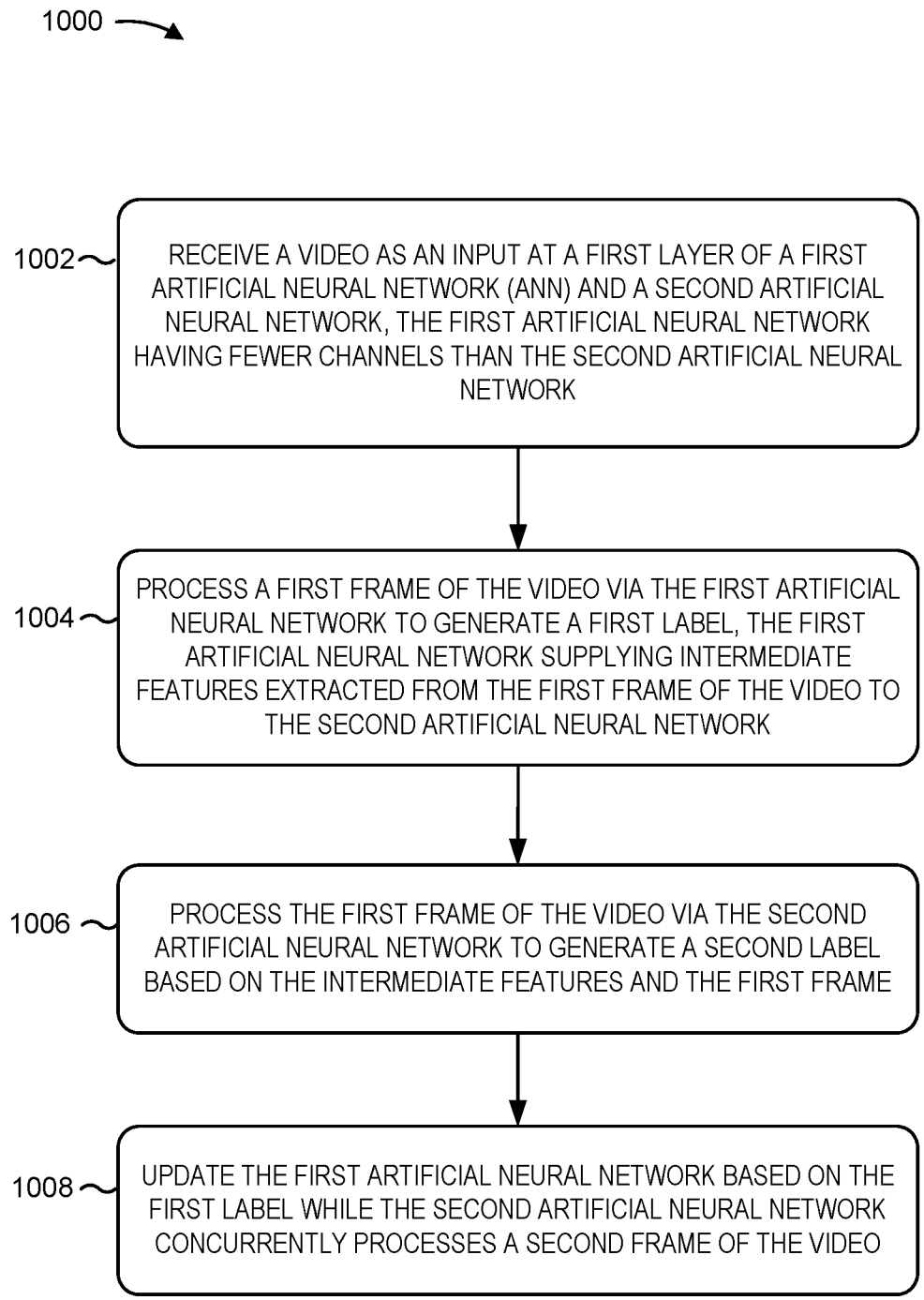

FIG. 10 illustrates a method 1000 for processing a video, in accordance with aspects of the present disclosure. As shown in FIG. 10, at block 1002, the method 1000 receives a video as an input at a first layer of a first artificial neural network (ANN) and a second artificial neural network. The first artificial neural network has fewer channels than the second artificial neural network. For instance, as shown in FIG. 7, the example architecture 700 includes a segmentation network 704 and an auxiliary network 706. The segmentation network 704 and the auxiliary network 706 each receive a video 702 as input. Additionally, the auxiliary network 706 may have a similar architecture to the architecture of the segmentation network 704. For instance, in some aspects, the auxiliary network 706 may be configured with fewer channels (e.g., the auxiliary network 706 may have 18 channels whereas the segmentation network 704 may have 48 channels) or may operate at a lower resolution than the segmentation network 704.

At block 1004, the method 1000 processes a first frame of the video via the first artificial neural to generate a first label. The first artificial neural network supplies intermediate features extracted from the first frame of the video to the second artificial neural network. For example, as discussed with reference to FIG. 7, the auxiliary network 706 processes each frame of the video and generates a segment 708. The auxiliary network 706 supplies intermediate features to the segmentation network 704. The segmentation network 704 processes the intermediate features, which are aggregated to compute the output segment 710.

At block 1006 the method 1000 processes the first frame of the video via the second artificial neural network to generate a second label based on the intermediate features and the first frame. For example, segmentation network 704 processes each frame of the video 702 and generates an output segment 710.

At block 1008, the method 1000 updates the first artificial neural network based on the first label while the second artificial neural network concurrently processes a second frame of the video. As discussed with reference to FIG. 7, the pseudo-label 712 may be used to update the auxiliary network 706, for example, via back propagation while the segmentation network 704 continues to process video 702 in the forward pass.

In one aspect, the receiving means, the processing means, and/or the updating means may be the CPU 102, GPU 104, DSP 106 program memory associated with the CPU 102, the dedicated memory block 118, fully connected layers 362, NPU 428, and/or the routing connection processing unit 216 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

Implementation examples are provided in the following numbered clauses:

1. A method for processing a video, comprising:
   receiving the video as an input at a first layer of an artificial neural network (ANN);
   processing a first frame of the video to generate a first label; and
   updating the artificial neural network based on the first label, the updating being performed while concurrently processing a second frame of the video.
2. The method of clause 1, further comprising applying the first label in a backward pass of the artificial neural network to update the artificial neural network.
3. The method of any of clauses 1-2, further comprising generating a second label based on the second frame, and in which the concurrent processing is conducted to reduce a temporal inconsistency between the first label and the second label.
4. A method for processing a video, comprising:
   receiving the video as an input at a first layer of a first artificial neural network (ANN) and a second artificial neural network, the first artificial neural network having fewer channels than the second artificial neural network;
   processing a first frame of the video via the first artificial neural network to generate a first label, the first artificial neural network supplying intermediate features extracted from the first frame of the video to the second artificial neural network;
   processing the first frame of the video via the second artificial neural network to generate a second label based on the intermediate features and the first frame; and
   updating the first artificial neural network based on the first label while the second artificial neural network concurrently processes a second frame of the video.
5. The method of clause 4, further comprising generating via the second artificial neural network a third label based on the second frame, and in which the concurrent processing is conducted such that a temporal inconsistency between the second label and the third label is reduced.
6. The method of any of clauses 4-5, in which the first artificial neural network operates at a lower resolution than the second artificial neural network.
7. An apparatus for processing a video, comprising:
   a memory; and
   at least one processor coupled to the memory, the at least one processor being configured:
      to receive the video as an input at a first layer of an artificial neural network (ANN);
      to process a first frame of the video to generate a first label; and
      to update the artificial neural network based on the first label, the update being performed while concurrently processing a second frame of the video.
8. The apparatus of clause 7, in which the at least one processor is further configured to apply the first label in a backward pass of the artificial neural network to update the artificial neural network.
9. The apparatus of any of clauses 7-8, in which the at least one processor is further configured to generate a second label based on the second frame, and in which the concurrent processing is conducted to reduce a temporal inconsistency between the first label and the second label.
10. An apparatus for processing a video, comprising:
    a memory; and
    at least one processor coupled to the memory, the at least one processor being configured:
       to receive the video as an input at a first layer of a first artificial neural network (ANN) and a second artificial neural network, the first artificial neural network having fewer channels than the second artificial neural network;
       to process a first frame of the video via the first artificial neural network to generate a first label, the first artificial neural network supplying intermediate features extracted from the first frame of the video to the second artificial neural network;
       to process the first frame of the video via the second artificial neural network to generate a second label based on the intermediate features and the first frame; and
       to update the first artificial neural network based on the first label while the second artificial neural network concurrently processes a second frame of the video.
11. The apparatus of clause 10, in which the at least one processor is further configured to generate, via the second artificial neural network, a third label based on the second frame, and in which the concurrent processing is conducted such that a temporal inconsistency between the second label and the third label is reduced.
12. The apparatus of clause 10, in which the first artificial neural network operates at a lower resolution than the second artificial neural network.
13. An apparatus for processing a video, comprising:
    means for receiving the video as an input at a first layer of an artificial neural network (ANN);
    means for processing a first frame of the video to generate a first label; and
    means for updating the artificial neural network based on the first label, the updating being performed while concurrently processing a second frame of the video.
14. The apparatus of clause 13, further comprising means for applying the first label in a backward pass of the artificial neural network to update the artificial neural network.
15. The apparatus of any of clauses 13-14, further comprising means for generating a second label based on the second frame, and in which the concurrent processing is conducted to reduce a temporal inconsistency between the first label and the second label.
16. An apparatus for processing a video, comprising:
    means for receiving the video as an input at a first layer of a first artificial neural network (ANN) and a second artificial neural network, the first artificial neural network having fewer channels than the second artificial neural network;
    means for processing a first frame of the video via the first artificial neural network to generate a first label, the first artificial neural network supplying intermediate features extracted from the first frame of the video to the second artificial neural network;
    means for processing the first frame of the video via the second artificial neural network to generate a second label based on the intermediate features and the first frame; and
    means for updating the first artificial neural network based on the first label while the second artificial neural network concurrently processes a second frame of the video.
17. The apparatus of clause 16, further comprising means for generating via the second artificial neural network a third label based on the second frame, and in which the concurrent processing is conducted such that a temporal inconsistency between the second label and the third label is reduced.

18. The apparatus of any of clauses 16-17, in which the first artificial neural network operates at a lower resolution than the second artificial neural network.

19. A non-transitory computer readable medium having encoded thereon program code for processing a video, the program code being executed by a processor and comprising:
    program code to receive the video as an input at a first layer of an artificial neural network (ANN);
    program code to process a first frame of the video to generate a first label; and
    program code to update the artificial neural network based on the first label, the update being performed while concurrently processing a second frame of the video.

20. The non-transitory computer readable medium of clause 19, further comprising program code to apply the first label in a backward pass of the artificial neural network to update the artificial neural network.

21. The non-transitory computer readable medium of any of clauses 19-20, further comprising program code to generate a second label based on the second frame, and in which the concurrent processing is conducted to reduce a temporal inconsistency between the first label and the second label.

22. A non-transitory computer readable medium having encoded thereon program code for processing a video, the program code being executed by a processor and comprising:
    program code to receive the video as an input at a first layer of a first artificial neural network (ANN) and a second artificial neural network, the first artificial neural network having fewer channels than the second artificial neural network;
    program code to process a first frame of the video via the first artificial neural network to generate a first label, the first artificial neural network supplying intermediate features extracted from the first frame of the video to the second artificial neural network;
    program code to process the first frame of the video via the second artificial neural network to generate a second label based on the intermediate features and the first frame; and
    program code to update the first artificial neural network based on the first label while the second artificial neural network concurrently processes a second frame of the video.

23. The non-transitory computer readable medium apparatus of clause 22, further comprising program code to generate, via the second artificial neural network, a third label based on the second frame, and in which the concurrent processing is conducted such that a temporal inconsistency between the second label and the third label is reduced.

24. The non-transitory computer readable medium of any of clauses 22-23, in which the first artificial neural network operates at a lower resolution than the second artificial neural network.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer- readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method for processing a video, the processor-implemented method being performed by at least one processor and comprising:
   receiving the video as an input at a first layer of an artificial neural network (ANN);
   processing a first frame of the video to generate a first output segment;
   generating a pseudo label for the first frame by applying an argmax function to the first output segment; and
   updating the artificial neural network based on a cross-entropy loss computed as a function of the first output segment and the pseudo label for the first frame of the video.

2. The processor-implemented method of claim 1, further comprising applying the cross-entropy loss in a backward pass of the artificial neural network.

3. The processor-implemented method of claim 1, further comprising generating a second output segment based on a second frame.

4. A processor-implemented method for processing a video, the processor-implemented method being performed by at least one processor and comprising:
   receiving the video as an input at a first layer of a first artificial neural network (ANN) and a second artificial neural network, the first artificial neural network having fewer channels than the second artificial neural network;
   processing a first frame of the video via the first artificial neural network to generate a first label, the first artificial neural network supplying intermediate features extracted from the first frame of the video to the second artificial neural network;
   processing the first frame of the video via the second artificial neural network to extract a set of features of the first frame;
   aggregating, by the second ANN, the intermediate features from the first ANN with the set of features of the first frame extracted by the second ANN to produce a set of aggregated features of the first frame from the first ANN and the second ANN;
   generating, by the second ANN, a second label based on the set of aggregated features of the of the first frame from the first ANN and the second ANN; and
   updating the first artificial neural network based on a cross-entropy loss computed as a function of the first label and the second label while the second artificial neural network concurrently processes a second frame of the video.

5. The processor-implemented method of claim 4, in which the first artificial neural network operates at a lower resolution than the second artificial neural network.

6. An apparatus for processing a video, comprising:
   at least one memory; and
   at least one processor coupled to the at least one memory, the at least one processor being configured to:
      receive the video as an input at a first layer of a first artificial neural network (ANN) and a second artificial neural network, the first artificial neural network having fewer channels than the second artificial neural network;
      process a first frame of the video via the first artificial neural network to generate a first label, the first artificial neural network supplying intermediate features extracted from the first frame of the video to the second artificial neural network;
      process the first frame of the video via the second artificial neural network to extract a set of features of the first frame;
      aggregate, by the second ANN, the intermediate features from the first ANN with the set of features of the first frame extracted by the second ANN to produce a set of aggregated features of the first frame from the first ANN and the second ANN;
      generate, by the second ANN, a second label based on the set of aggregated features of the of the first frame from the first ANN and the second ANN; and
      update the first artificial neural network based on a cross-entropy loss computed as a function of the first label generated by the first ANN and the second label generated by the second ANN, while the second artificial neural network concurrently processes at least one subsequent frame of the video.

7. The apparatus of claim 6, in which the at least one processor is further configured to generate, via the second artificial neural network, a third label based on the second frame, and in which the concurrent processing is conducted such that a temporal inconsistency between the second label and the third label is reduced.

8. The apparatus of claim 6, in which the first artificial neural network operates at a lower resolution than the second artificial neural network.

9. A non-transitory computer readable medium having encoded thereon program code for processing a video, the program code being executed by a processor and comprising:
   program code to receive the video as an input at a first layer of a first artificial neural network (ANN) and a second artificial neural network, the first artificial neural network having fewer channels than the second artificial neural network;
   program code to process a first frame of the video via the first artificial neural network to generate a first label, the first artificial neural network supplying intermediate features extracted from the first frame of the video to the second artificial neural network;
   program code to process the first frame of the video via the second artificial neural network to extract a set of features of the first frame;
   program code to aggregate, by the second ANN, the intermediate features from the first ANN with the set of features of the first frame extracted by the second ANN to produce a set of aggregated features of the first frame from the first ANN and the second ANN;
   program code to generate, by the second ANN, a second label based on the set of aggregated features of the first frame from the first ANN and the second ANN; and
   program code to update the first artificial neural network based on a cross-entropy loss computed as a function of the first label generated by the first ANN and the second label generated by the second ANN, while the second artificial neural network concurrently processes at least one subsequent frame of the video.

10. The non-transitory computer readable medium apparatus of claim 9, further comprising program code to generate, via the second artificial neural network, a third label based on the second frame, and in which the concurrent processing is conducted such that a temporal inconsistency between the second label and the third label is reduced.

11. The non-transitory computer readable medium of claim 9, in which the first artificial neural network operates at a lower resolution than the second artificial neural network.

12. The processor-implemented method of claim 1, wherein the artificial neural network is updated at test time.

13. The processor-implemented method of claim 4, further comprising generating via the second artificial neural network a third label based on the second frame, and in which the concurrent processing is conducted such that a temporal inconsistency between the second label and the third label is reduced.

* * * * *